(12) United States Patent
Lerch et al.

(10) Patent No.: US 7,562,445 B2
(45) Date of Patent: *Jul. 21, 2009

(54) METHOD OF MANUFACTURE OF AN IDENTIFICATION WRISTBAND CONSTRUCTION

(75) Inventors: John W. Lerch, Indian Harbour Beach, FL (US); Joshua M. Girvin, Indialantic, FL (US)

(73) Assignee: Bartronics America, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/488,278

(22) Filed: Jul. 18, 2006

(65) Prior Publication Data

US 2007/0011870 A1  Jan. 18, 2007

Related U.S. Application Data (60) Provisional application No. 60/700,695, filed on Jul. 18, 2005.

(51) Int. Cl.
*H05K 3/30* (2006.01)
*H01Q 17/00* (2006.01)
(52) U.S. Cl. .................. 29/832; 29/600; 29/601; 29/846; 235/488; 235/492
(58) Field of Classification Search .............. 29/600, 29/601, 832, 846; 235/488, 492
See application file for complete search history.

(56) References Cited

U.S. PATENT DOCUMENTS

| | | | |
|---|---|---|---|
| D253,258 S | 10/1979 | Clark | |
| 4,272,900 A | 6/1981 | MacLarty et al. | |
| 4,318,234 A | 3/1982 | Charles et al. | |
| 4,736,196 A | 4/1988 | McMahon et al. | |
| 4,800,543 A | 1/1989 | Lydon-James et al. | |
| 4,833,807 A | 5/1989 | McLean | |
| 4,835,372 A | 5/1989 | Gombrich et al. | |
| 4,857,893 A | 8/1989 | Carroll | |
| 4,885,571 A | 12/1989 | Pauley et al. | |
| 4,914,843 A | 4/1990 | DeWoskin | |
| 4,973,944 A | 11/1990 | Maletta | |
| 4,980,671 A | 12/1990 | McCurdy | |
| 5,032,823 A | 7/1991 | Bower et al. | |
| 5,092,067 A | 3/1992 | Prout | |
| 5,115,223 A | 5/1992 | Moody | |
| D342,595 S | 12/1993 | Day | |
| 5,364,133 A | 11/1994 | Hofer et al. | |
| 5,374,921 A | 12/1994 | Martin et al. | |
| 5,423,574 A | 6/1995 | Forte-Pathroff | |
| 5,430,441 A | 7/1995 | Bickley et al. | |
| 5,448,846 A | 9/1995 | Peterson et al. | |
| 5,457,906 A | 10/1995 | Mosher, Jr. | |
| 5,471,197 A | 11/1995 | McCurdy et al. | |
| 5,499,468 A | 3/1996 | Henry | |

(Continued)

*Primary Examiner*—C. J Arbes
(74) *Attorney, Agent, or Firm*—Hamilton, Brook, Smith & Reynolds, P.C.

(57) ABSTRACT

A method of manufacture of a wristband includes the steps of providing a bottom substrate. First circuit elements are deposited on the bottom substrate. A dielectric material is deposited at predetermined areas on the bottom substrate. A remainder of the circuit is deposited on the bottom substrate and dielectric materials. A transponder chip is secured to the bottom substrate to form a transponder. A second substrate is affixed to the bottom substrate such that the dielectric material and transponder are disposed between the bottom substrate and second substrate.

12 Claims, 7 Drawing Sheets

U.S. PATENT DOCUMENTS

| | | | |
|---|---|---|---|
| 5,504,474 A | 4/1996 | Libman et al. | |
| 5,512,879 A | 4/1996 | Stokes | |
| 5,525,969 A | 6/1996 | LaDue | |
| 5,581,924 A | 12/1996 | Peterson | |
| 5,612,675 A | 3/1997 | Jennings et al. | |
| 5,627,520 A | 5/1997 | Grubbs et al. | |
| 5,644,295 A | 7/1997 | Connolly et al. | |
| 5,646,592 A | 7/1997 | Tuttle | |
| 5,754,110 A | 5/1998 | Appalucci et al. | |
| 5,781,442 A | 7/1998 | Engleson et al. | |
| 5,831,535 A | 11/1998 | Reisman et al. | |
| 5,867,102 A | 2/1999 | Souder et al. | |
| 5,873,188 A | 2/1999 | Gehris | |
| 5,883,576 A | 3/1999 | De La Huerga | |
| 5,973,598 A | 10/1999 | Beigel | |
| 5,973,600 A * | 10/1999 | Mosher, Jr. | 340/572.8 |
| 5,977,877 A | 11/1999 | McCulloch et al. | |
| 5,979,941 A | 11/1999 | Mosher, Jr. et al. | |
| 6,021,494 A | 2/2000 | Bolan et al. | |
| 6,043,746 A | 3/2000 | Sorrells | |
| 6,050,622 A | 4/2000 | Gustafson | |
| 6,055,756 A | 5/2000 | Aoki | |
| 6,058,637 A | 5/2000 | Duncan | |
| 6,072,396 A | 6/2000 | Gaukel | |
| 6,079,135 A | 6/2000 | Ruiz | |
| 6,092,321 A | 7/2000 | Cheng | |
| 6,100,804 A * | 8/2000 | Brady et al. | 340/572.7 |
| 6,104,295 A | 8/2000 | Gaisser et al. | |
| 6,104,311 A | 8/2000 | Lastinger | |
| 6,107,920 A | 8/2000 | Eberhardt et al. | |
| 6,111,520 A | 8/2000 | Allen et al. | |
| 6,142,368 A | 11/2000 | Mullins et al. | |
| 6,144,303 A | 11/2000 | Federman | |
| 6,211,790 B1 | 4/2001 | Radomsky et al. | |
| 6,219,789 B1 | 4/2001 | Little et al. | |
| 6,236,319 B1 | 5/2001 | Pitzer et al. | |
| 6,255,951 B1 | 7/2001 | De La Huerga | |
| 6,335,907 B1 | 1/2002 | Momich et al. | |
| 6,346,886 B1 | 2/2002 | De La Huerga | |
| 6,349,493 B1 | 2/2002 | Newman et al. | |
| 6,352,045 B1 | 3/2002 | Takashima | |
| 6,352,205 B1 | 3/2002 | Mullins et al. | |
| 6,373,447 B1 | 4/2002 | Rostoker et al. | |
| 6,384,727 B1 | 5/2002 | Diprizio et al. | |
| 6,392,543 B2 | 5/2002 | Maloney | |
| 6,421,013 B1 | 7/2002 | Chung | |
| 6,424,623 B1 | 7/2002 | Borgstahl et al. | |
| 6,431,455 B1 | 8/2002 | Ponert | |
| 6,434,158 B1 | 8/2002 | Harris et al. | |
| 6,434,159 B1 | 8/2002 | Woodward et al. | |
| 6,472,989 B2 | 10/2002 | Roy, Jr. | |
| 6,474,557 B2 | 11/2002 | Mullins et al. | |
| 6,480,110 B2 | 11/2002 | Lee et al. | |
| 6,483,427 B1 | 11/2002 | Werb | |
| 6,663,006 B2 | 12/2003 | Mullins et al. | |
| 6,693,543 B1 | 2/2004 | Stephenson et al. | |
| 6,744,367 B1 | 6/2004 | Foster | |
| 6,772,546 B2 | 8/2004 | Latschbacher et al. | |
| 6,782,648 B1 | 8/2004 | Mosher, Jr. | |
| 6,806,812 B1 | 10/2004 | Cathey | |
| 6,888,502 B2 | 5/2005 | Beigel et al. | |
| 6,888,509 B2 | 5/2005 | Atherton | |
| 6,933,844 B2 | 8/2005 | Augspurger et al. | |
| 6,958,677 B1 | 10/2005 | Carter | |
| 7,042,357 B2 * | 5/2006 | Girvin et al. | 340/568.2 |
| 7,049,962 B2 | 5/2006 | Atherton et al. | |
| 7,119,690 B2 * | 10/2006 | Lerch et al. | 340/572.1 |
| 7,204,425 B2 | 4/2007 | Mosher, Jr. et al. | |
| 2002/0007292 A1 | 1/2002 | Paxton et al. | |
| 2002/0049656 A1 | 4/2002 | Lancos et al. | |
| 2002/0067264 A1 | 6/2002 | Soehnlen | |
| 2002/0070865 A1 | 6/2002 | Lancos et al. | |
| 2002/0082897 A1 | 6/2002 | Menelly et al. | |
| 2002/0084904 A1 | 7/2002 | De La Huerga | |
| 2003/0075608 A1 | 4/2003 | Atherton | |
| 2003/0174049 A1 | 9/2003 | Beigel et al. | |
| 2004/0060215 A1 | 4/2004 | Riley | |
| 2004/0066296 A1 | 4/2004 | Atherton | |
| 2004/0104274 A1 * | 6/2004 | Kotik et al. | 235/492 |
| 2004/0189470 A1 | 9/2004 | Girvin et al. | |
| 2004/0237367 A1 | 12/2004 | Ali | |
| 2005/0184874 A1 * | 8/2005 | Mosher, Jr. | 340/572.8 |
| 2005/0262746 A1 | 12/2005 | Ali et al. | |
| 2005/0279001 A1 | 12/2005 | Riley | |
| 2006/0143961 A1 | 7/2006 | Riley | |
| 2006/0187065 A1 * | 8/2006 | Girvin et al. | 340/572.9 |
| 2006/0202829 A1 * | 9/2006 | Girvin et al. | 340/572.3 |

\* cited by examiner

METHOD OF MANUFACTURE OF AN IDENTIFICATION WRISTBAND CONSTRUCTION

CROSS-REFERENCE TO RELATED APPLICATIONS

This Application is a Non-Prov of Prov (35 USC 119(e)) application 60/700,695 filed on Jul. 18, 2005.

BACKGROUND OF THE INVENTION

Disposable wristbands have long been used for such things as identification, access control, age verification, among other purposes. Such wristbands have typically been made from materials such as polyester, paper, or vinyl. The physical presence of a wristband of particular color or design is used to identify the wearer as a member of a particular group. These colored wristbands have been used to control access to restricted areas or for other purposes in large crowded venues such as a sports stadium. For example, patrons who provide proof of legal drinking age are issued a wristband of a particular color, to indicate that they have permission to access a beer sales area.

In recent years, such wristbands have been augmented with Radio Frequency Identification (RFID) technology. RFID extends the usefulness of such wristbands, as they can each be programmed with a unique code that quickly and easily identifies the wearer. RFID also adds new functionality to such wristbands. As one example, they can be used to locate the wearer. Thus, with the installation of appropriate radio location equipment, a lost child wearing an RFID wristband can be easily found, or prevented from leaving an amusement park unless accompanied by an authorized adult.

RFID wristbands are also used to allow the purchase of items without the exchange of currency or need for a credit/debit card, or to allow secure communication and monetary exchange among patrons. With this type of RFID wristband, a patron can request the wristband be credited for purchases up to a preselected amount. Purchases can then be made by presenting the wristband at a special RFID reader, instead of using cash or credit/debit cards. These wristbands can also be coded so that a wearer would be prevented from making certain purchases, or from making a single purchase above a chosen limit. This feature can be used to control purchases by children, for example, so they are encouraged to spend their allotted funds wisely.

However, even such RFID wristbands are susceptible to misuse and unauthorized use. Some wristbands are easily removed, and yet still function after removal. A wristband that still functions after it has been removed provides the opportunity for patrons to exchange wristbands. This could provide patrons with the opportunity to give access to a restricted area to an unauthorized patron. A patron issued an "adult" wristband that allows access to beer sales, for example, could remove and give or sell that wristband to a patron not of legal drinking age. As another example, a thoughtlessly discarded wristband that still has funds credited to it could be retrieved and used by an unauthorized individual to purchase goods or services using someone else's account.

BRIEF SUMMARY OF THE INVENTION

Wristbands of the type described above are typically intended to be disposable, and may only be used for a few hours. As such, what is needed is a way to manufacture such a wristband to include RFID functionality and security features, without greatly impacting the overall cost.

The method of manufacture of the wristband includes providing a bottom substrate. First circuit elements are deposited on the bottom substrate. The first circuit elements are cured. A dielectric material is deposited at predetermined areas on the bottom substrate. A remainder of the circuit is deposited on the bottom substrate and dielectric materials. A transponder chip is secured to the bottom substrate to form a transponder. A second substrate is affixed to the bottom substrate such that the dielectric material and circuitry are disposed between the bottom substrate and second substrate.

The present invention is a design and a construction technique for such a wristband.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
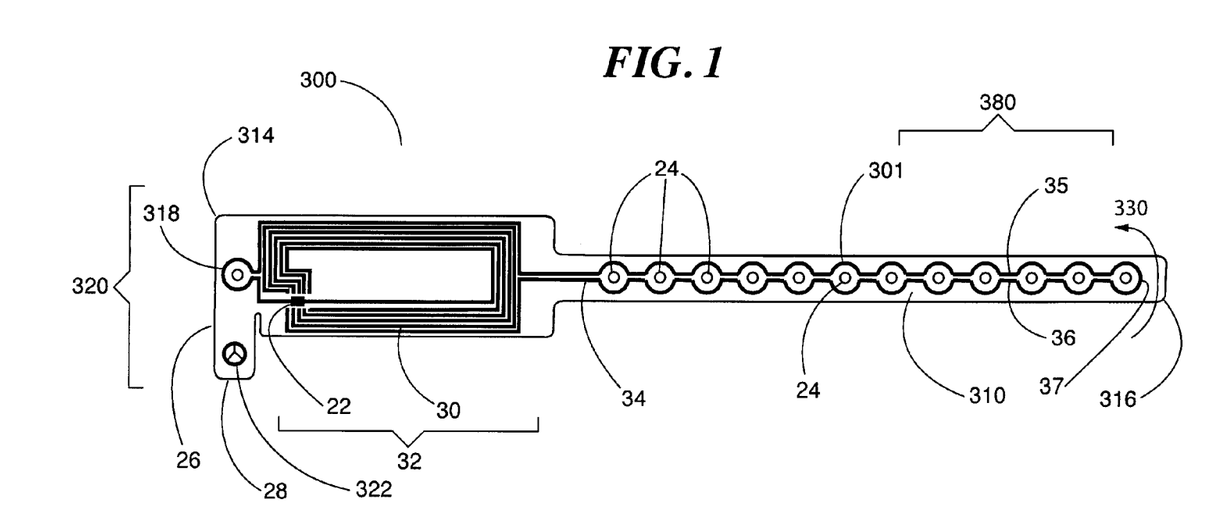
FIG. 1 is a plan view of one embodiment of a wristband according to the present invention not showing a top substrate.

FIG. 1 is a general illustration of a disabling Radio Frequency Identification (RFID) wristband 300 constructed according to the presenting invention. Wristband 300 is in the form of an elongated band 310 with opposite ends 314, 316 that are brought together and fastened to form a closed loop around a wearer's wrist or other body part.

Wristband 300 contains a transponder 32, which is comprised of an antenna 30 operatively coupled to a Radio Frequency Identification (RFID) circuit 22. Antenna 30 is coupled to one or more conductive wires acting as transponder disabling wires 34 such that current will flow through conductive wire(s) 34 in the path illustrated by arrow 330 when transponder 32 is functioning. In the illustrated embodiment, conductive wire(s) 34 include a top conductor 35 and a bottom conductor 36, which are joined at a node 37. As will be described in more detail below, if a discontinuity becomes present in any of transponder disabling wires 34, then transponder 32 will become disabled. Hence, conductive wire 34 is also referred to herein as a transponder disabling wire 34.

Wristband 300 also preferably includes a mechanical non-reusable tamper-resistant locking mechanism 320 to fasten band 310 upon itself at end 314 and to prevent the user from attempting to open the locking mechanism 320 to remove the wristband 300 without rendering those tampering efforts visually evident.

Locking mechanism 320 comprises a barbed peg 318 disposed on band 310 at end 314. A locking hole 322 is disposed on flap 28 at end 314 of band 310 across a fold line 26 from barbed peg 318. A number of adjustment openings or adjustment holes 24 extend along band 310 in a direction towards end 316. Adjustment holes 24 are used to adjust the wristband 300 to conform to body parts of different circumferences.

When ends 314, 316 are brought together, the barbed peg 318 is arranged to pass through a selected hole 24 as required for a snug fit. The flap 28 is then folded along imaginary fold line 26 and barbed peg 318 is then passed through locking hole 322. Peg 318 is shaped to resist removal from the locking hole 322 without also destroying the locking mechanism 320 and rendering it incapable of being refastened. Alternatively, or in addition, adjustment holes 24 can be designed to replace or supplement locking hole 322 by configuring them in such a way that attempts to remove the wristband from the barbed peg 318 would also destroy the hole 24, thereby disabling the wristband and rendering it incapable of being refastened.

As mentioned previously, wristband 300 also includes a transponder 32. Transponder 32 contains an antenna 30 and an RFID integrated circuit (IC) chip 22. The transponder 32 responds to an RF interrogation signal and in response emits an RF signal representative of information pre-stored or pre-programmed into RFID integrated circuit chip 22. For example, the information could include the date the wristband 300 is issued, the date the wristband 300 expires and will no longer be usable for access, the age status of the wearer, and whether the wristband 300 can be used for purchasing goods or services. Any other desired information, depending on the context in which the wristband is to be used, may be pre-stored or pre-programmed in the transponder. The signal may also be used to access information stored in a database.

Being a passive-type RFID, the transponder 32 also derives a power signal from antenna 30 that supplies power to the rest of the RFID integrated circuit chip 22. In the preferred embodiment, the antenna 30 has the form of a continuous electrically conductive coil.

One or more transponder disabling wires 34 also extend away from the area occupied by the transponder 32. The transponder disabling wires 34 form an electrically conductive path, from antenna 30 out to end 316 and back to antenna 30, along substantially the entire length of the band 12 of wristband 300. As will be explained in detail below, the transponder disabling wires 34 are arranged to connect the components of transponder 32 and/or form portions of the components themselves, such that transponder disabling wires 34 must remain intact for the transponder 32 to operate.

In one embodiment, one or more of the transponder disabling wires 34 may function as part of antenna 30. In such an embodiment, consideration should be given to the distance between the sections of the loop antenna and transponder disabling wires 34 in order to minimize inductance that can lead to possible interference with the operation of the other components of transponder 32.

Transponder disabling wires 34 are preferably, but not necessarily, made from printed conductive ink that is robust enough to withstand normal handling but fragile enough that they will be broken if a user attempts to remove the wristband. Alternatively, transponder disabling wires 34 may be a thin wire such as copper wire, a thin foil, or other suitable electrically conductive material that will form an electrically continuous path but will break as a result of tampering. Forming transponder disabling wires 34 with frangible zones, where stresses from tampering attempts are most likely to occur, may facilitate breakage of the transponder disabling wires. Of course, if the user attempts to remove the wristband 300 with a cutting implement, the conductor forming transponder disabling wires 34 will also be severed.

Figure 2:
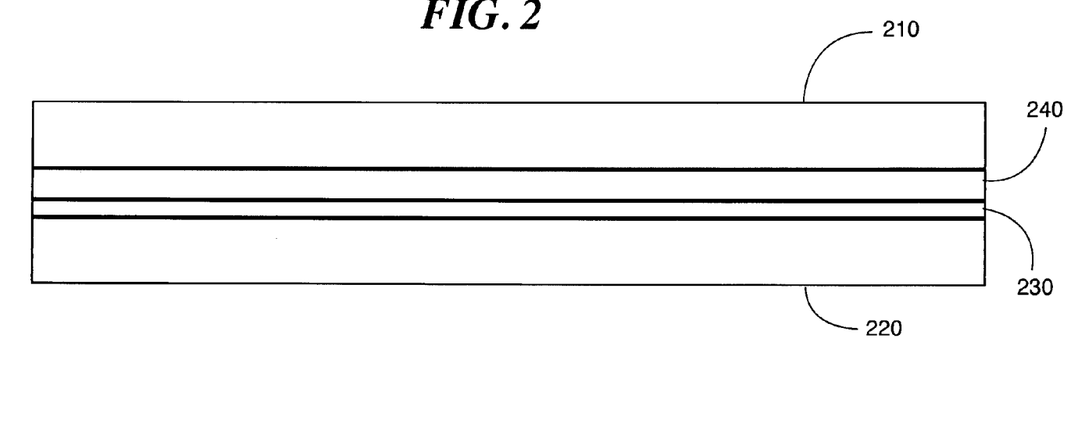
FIG. 2 is a cross section of the wristband.

Turning attention to FIG. 2, in a preferred embodiment the wristband is formed from two layers of a polymeric substrate material such as PET or other flexible plastic material. However, Dupont Teflon™, Teslin® or vinyl are examples of other possible materials. For comfort reasons it is preferred to have at least the bottom layer 220, which forms the substrate for the entire wristband 300, exhibit a low coefficient of friction and generally flexible nature, as it is that layer that will most likely come in close contact to the wearer's skin.

As described in detail below, the bottom layer 220 is used as a substrate on which are printed a circuit 230 that includes certain elements of transponder 32 such as the antenna 30 and certain circuit wiring, such as the disabling wire(s) 34. Conductive ink is used to form the antenna 30 and wiring 34.

The top layer 210 is typically formed of the same material as the bottom layer 220. It is used as a cover-lay for the wristband, and should readily accept printing inks so that identifying graphics, advertisements, or the like, can be printed thereon.

A pressure sensitive adhesive (PSA) 240 is used to bind the top 210 and bottom 220 layers. Alternative sealing techniques may also be used, such as heat sealing, radio-frequency sealing, ultrasound sealing, or a hot-melt adhesive.

Figure 3A:
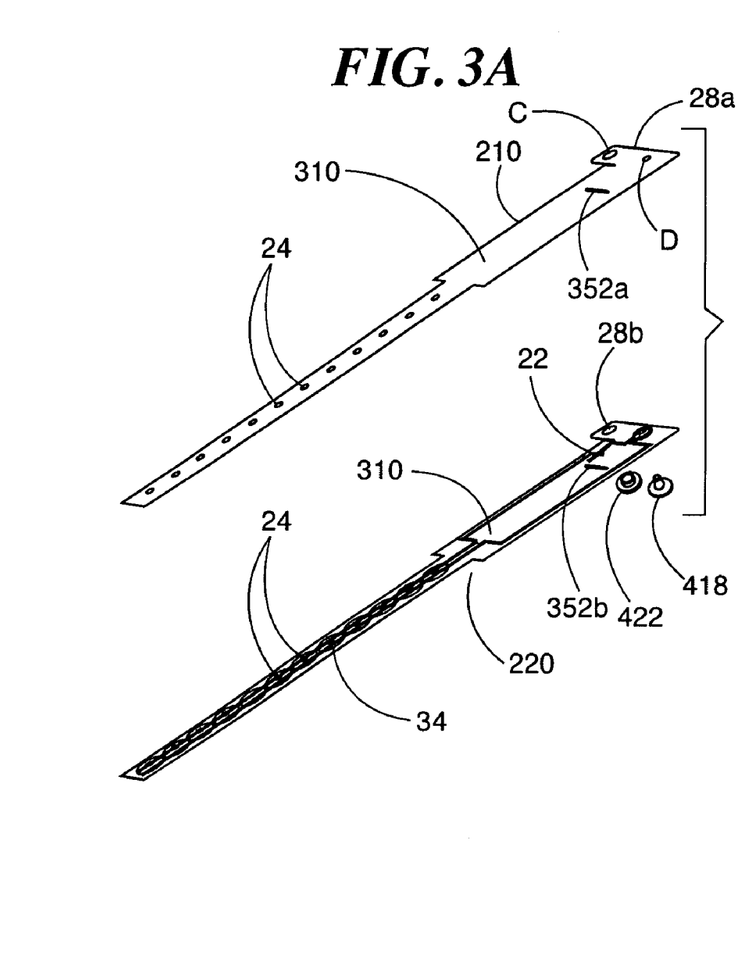
FIGS. 3A and 3B are an exploded view of the wristband showing a top layer and bottom layer.

Turning to FIGS. 3A-7D wristband 300 is described in greater detail. FIG. 3A shows an exploded view of the wristband prior to assembly of the two layers 210, 220. The bottom layer 220 is seen with the printed side up, after installation of the RFID integrated circuit chip 22, but prior to installation of snap insert 418 that includes the barbed peg 318 described above, and also prior to installation of snap retainer 422 that includes part of the locking hole 322.

A slit 352, formed by matching slits 352a, 352b, is formed in or near end 314 of wristband 300 to accommodate any extra length of band material from far end 316 after the band is fastened together. Flaps 28a, 28b form flap 28 when bottom 220 is joined to top 210.

Figure 3B:
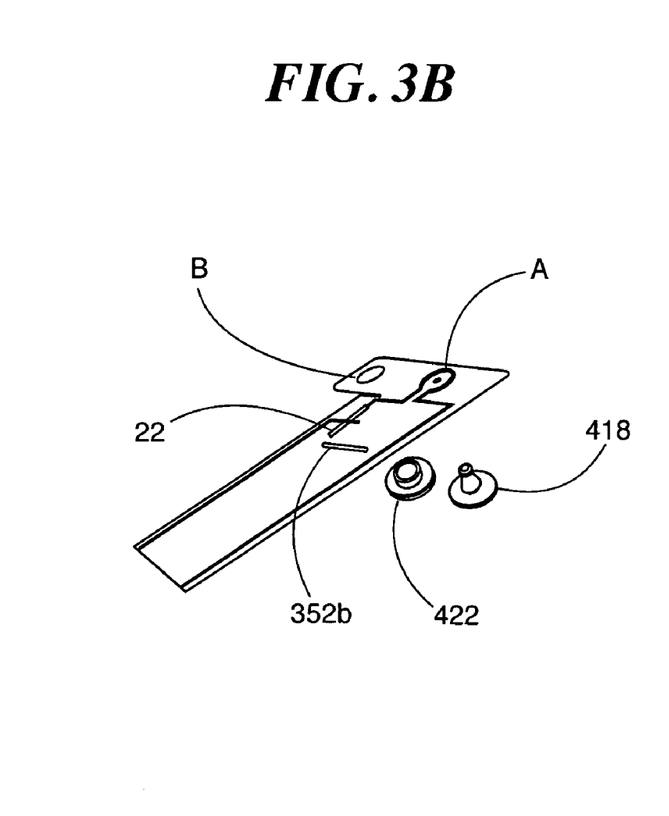
Figure 4:
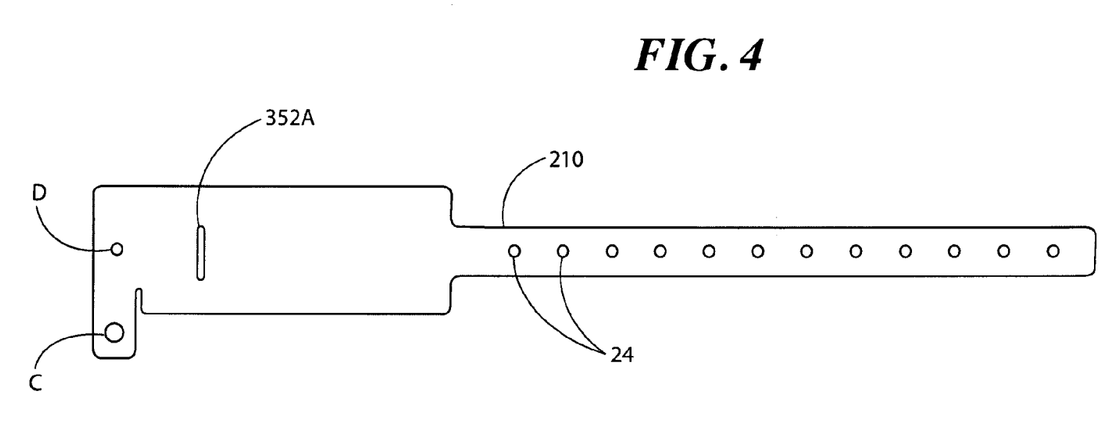
FIG. 4 is a top plan view of the top layer.
Figure 5:
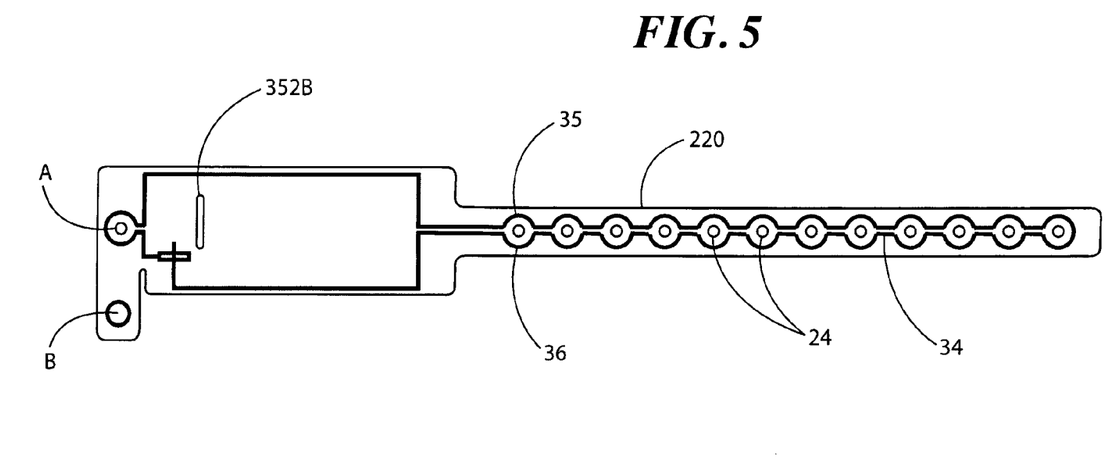
FIG. 5 is a top plan view of the bottom layer of the wristband of FIG. 1 illustrating the antenna and placement of the RFID integrated circuit chip.

FIG. 3B is a more detailed view illustrating more view of the wristband in the area of the antenna and the integrated circuit chip showing a crossover and more detail of the fastener. Hole A is shown for snap insert 418 and hole B for snap retainer 422. Corresponding holes C and D are formed in top layer 210 to receive snap insert 418 and snap retainer 422.

Figure 6A:
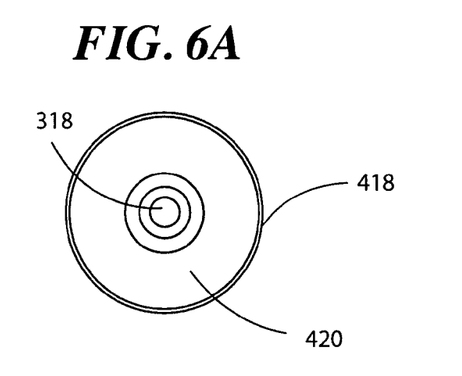
FIGS. 6A through 6D are a top plan, side elevation, bottom plan and perspective view respectively of one embodiment of a snap insert portion to be used with the wristband of FIG. 1.
Figure 6B:
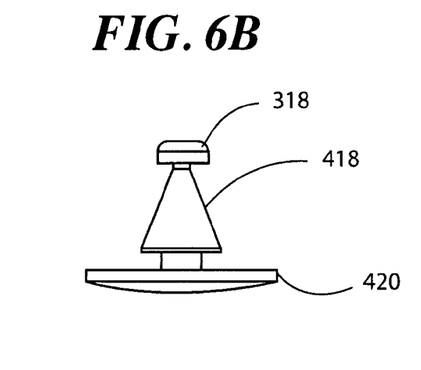
Figure 6C:
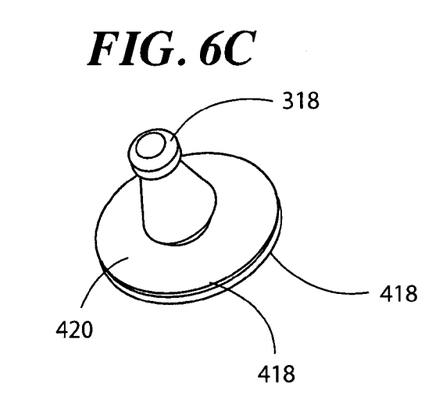
Figure 6D:
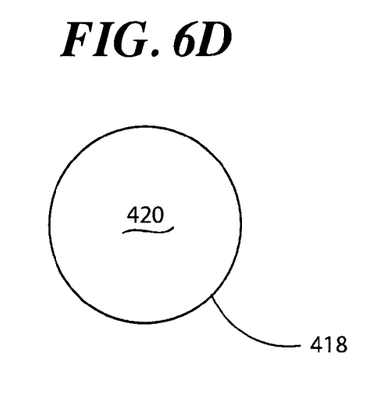
Figure 7A:
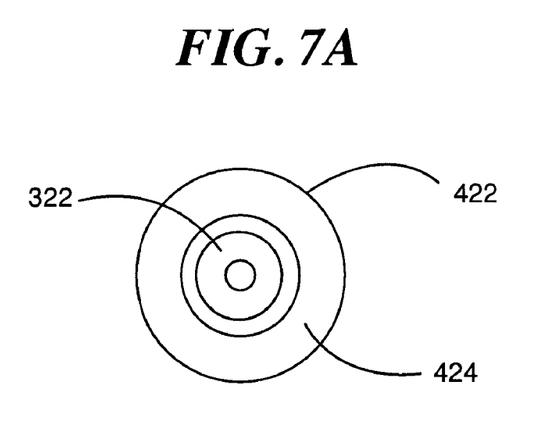
FIGS. 7A through 7D are a top plan, sectional, bottom plan and perspective view respectively of one embodiment of a snap retainer portion to be used with the snap insert portion of FIGS. 6A-6D.
Figure 7B:
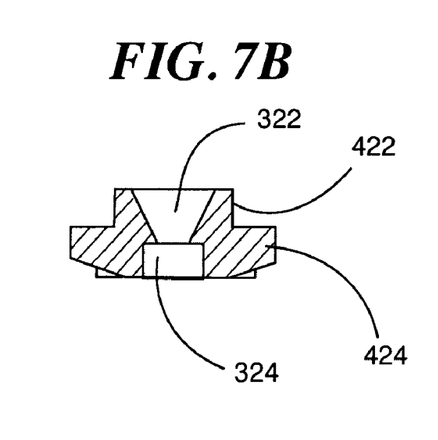
Figure 7C:
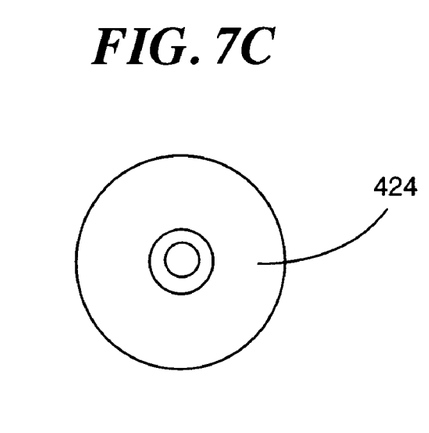
Figure 7D:
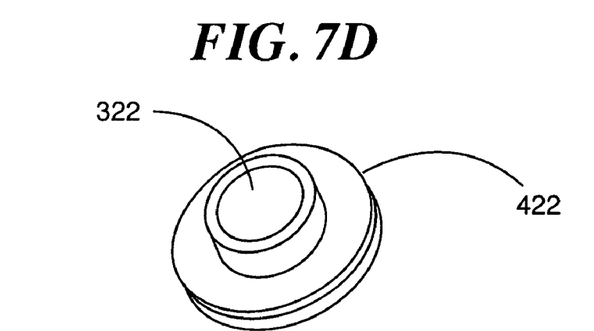

As seen in FIGS. 6A-6C, snap insert 418 includes a base 420 and a peg 318 extending from base 420. Base 420 is significantly greater in diameter than peg 318 and significantly greater in diameter than either one of hole A or hole D. In this way, when assembled, as discussed below, base 420 anchors peg 318 to wristband 300.

Similarly, as seen FIGS. 7A-7D, snap retainer 422 includes a locking hole 320 formed in a base 424. Base 424 has a diameter substantially greater than the diameter of the opening to hole 322 and substantially greater than the diameter of holes B and C. In this way, base 424 anchors snap retainer 422 to wristband 300 when assembled. It should be noted that the interior of hole 322 is sloped towards a retaining portion 324 to receive the surfaces of barbed peg 318, but prevent barbed peg 318 from being removed from receiving portion 324.

Figure 8:
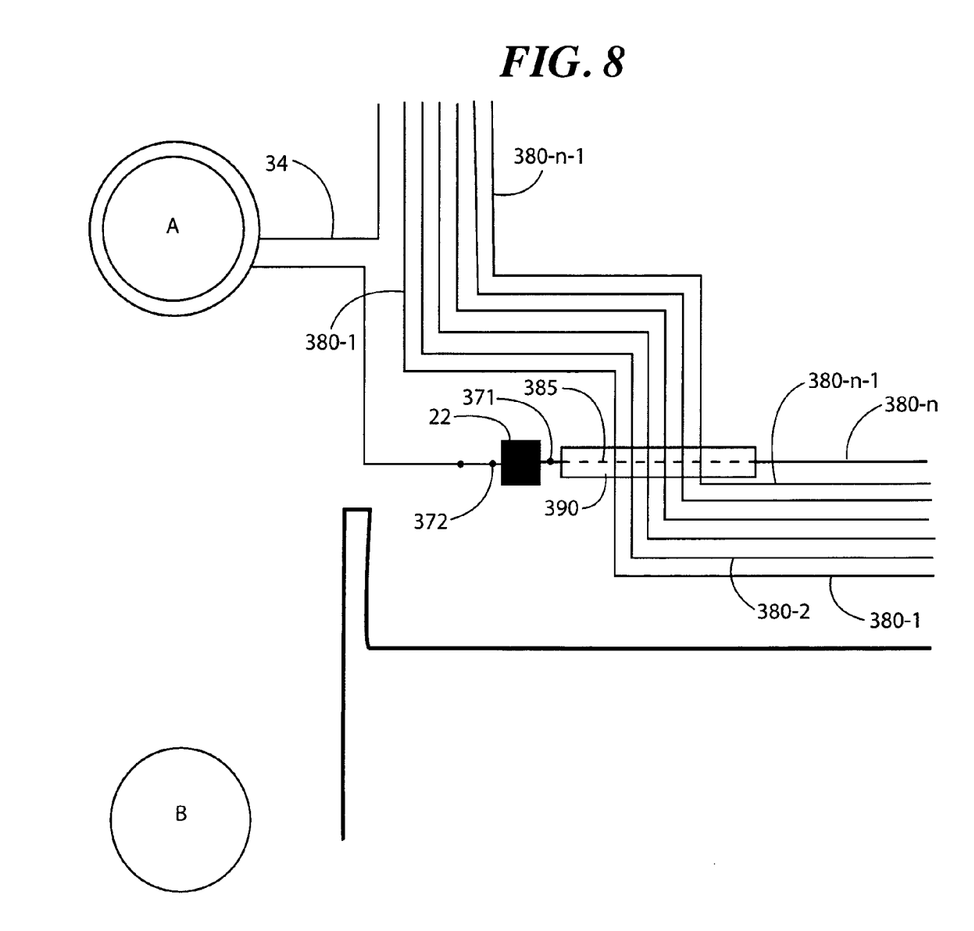
FIG. 8 is a view of a crossover portion illustrating how a circuit trace can connect to a terminal of an RFID integrated circuit chip, without shorting, to conductors of the antenna portion in accordance with one embodiment according to the present invention.

FIG. 8 illustrates still more detail of the construction of the wristband 300 near the antenna 30 and the RFID integrated circuit chip 22. The antenna 30 is defined as a set of individual wire traces 380-1, 380-2, 380-n that form a wire coil; wire traces 380 thus form a progressively smaller loop within a single printed circuit layer.

However, it is necessary to connect one terminal 371 of the chip 22 to one end of the antenna coil 30, and another terminal 372 of the chip 22 to the other end of the antenna coil 30 and/or the transponder disabling wires 34 (in the illustrated embodiment, the transponder disabling wired 34 is connected to terminal 372, so that transponder disabling wires 34 is placed in electrical series with the coiled traces 380).

To allow for this, without having the individual wire traces 380 of antenna 30 short against one another, a dielectric is used to form a crossover or bridge 390. As such, another conductive trace 385 can be placed over the dielectric bridge 390, completing the connection to terminal 371.

Figure 9:
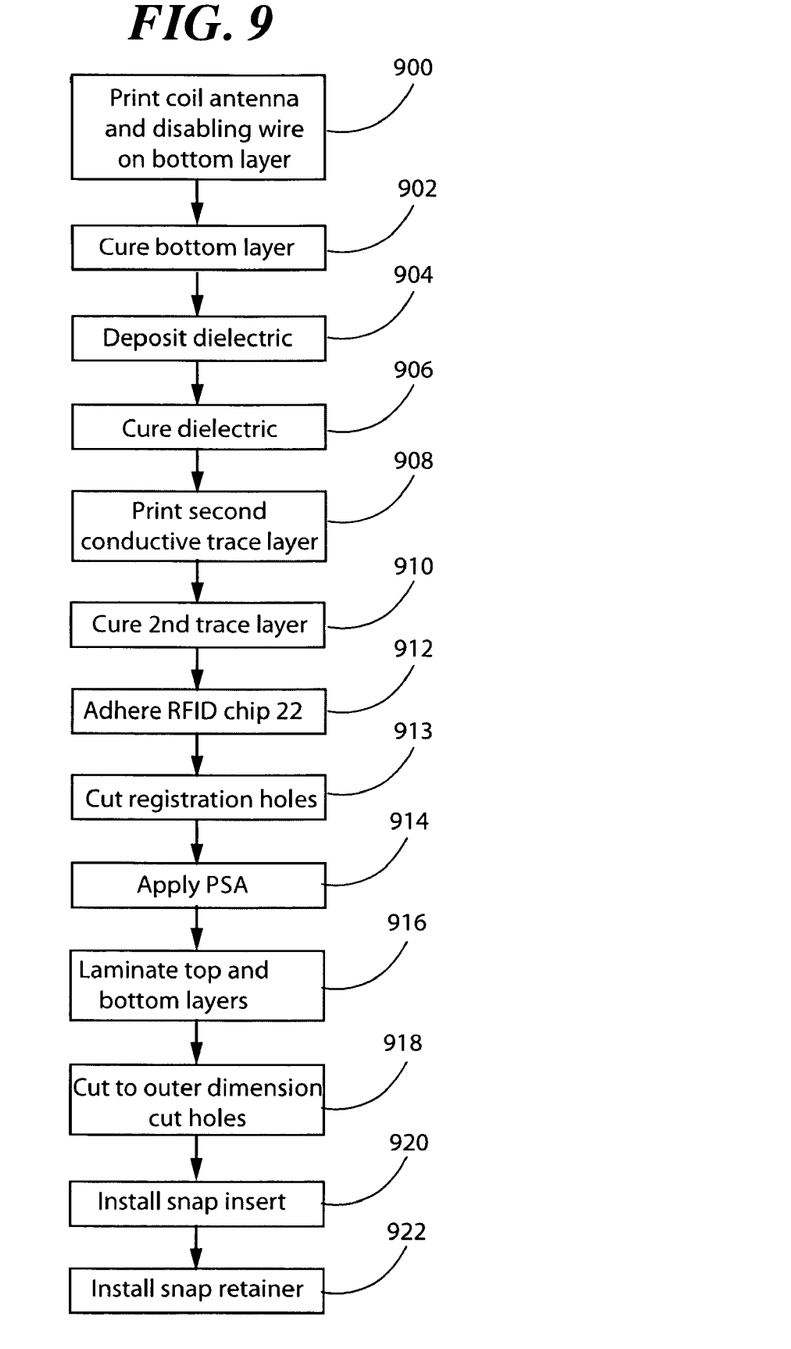
FIG. 9 is a flow chart for the processing steps used to manufacture the wristband in accordance with one embodiment of the present invention.

FIG. 9 illustrates the steps of a process that can be used to manufacture the wristband 300. Reference can be made back to FIGS. 2-8 while examining the steps of the process.

In a first step 900 of the process, a conductive ink is printed in a first pattern to define elements of the antenna 30 and the disabling wire 34 on the substrate formed by bottom layer 220. The substrate that forms bottom layer 220 is preferably pre-treated, such as by heating, such that further processing will not warp or shrink the substrate once circuit manufacturing has begun.

After the first printing step, a curing step 902 is performed, wherein heat and/or ultraviolet light is applied to cure the conductive ink on bottom layer 220.

In a next step 904, a dielectric material is applied in selected areas over the cured bottom layer. The dielectric is used to isolate certain conductive portions of the circuitry from other portions. For example, the dielectric is formed in the area of crossover or bridge 390. However, it can also be used in other areas for other bridge elements. It may be also desirable to use dielectric to isolate other circuitry and/or define vias between multiple printed circuit layers on bottom layer 220. For example, a serpentine pattern used for the transponder disabling wire 34 that encircles the holes may be defined on multiple printed circuit layers isolated by such dielectric.

The dielectric layer is then cured via UV light or heat in step 906, depending on the nature of the dielectric material.

Next, another printing step 908 may be used to print a second set of conductive traces that define further circuitry such as the crossover trace 385 on crossover or bridge 390 or conductive vias between printed layers, followed by a curing step 910.

Additionally, electronic components may be formed in steps. For example, a capacitor may be formed in steps 904 through 910 by printing two conductive parallel plates separated by dielectric layers, as is well understood in the art.

Additional dielectric layers and conductive ink layers may be patterned as desired to provide further circuitry definition by repeating steps 904 through 910.

In a next step 912, the RFID integrated circuit chip 22 is placed in the proper location on the bottom layer 220. The RFID integrated circuit chip 22 is preferably held in place in the desired location using a z-axis conductive adhesive, anisotropic conductive adhesive (ACA), or non-conductive paste (NCP). Alternatively, the RFID integrated circuit chip 22 may be connected using a soldering technique if proper steps are taken not to melt bottom layer 220. The RFID integrated circuit chip 22 can be any one of any number of different commercial off the shelf RFID integrated circuit chips, such as those available from Texas Instruments or Philips.

As desired, additional electronic components may be placed on bottom layer 220 in step 912 such as a thin-film battery.

In lamination steps 913, 914, and 916 the top layer 210 is laminated to the bottom layer 220 using a pressure sensitive adhesive (PSA) type adhesive. The adhesive may be applied first to one layer or the other, and then the two layers subjected to pressure such as by rollers. If no pre-treatment of the adhesive is required, then the cover layer 210 may come pre-coated with a PSA. Lamination integrity should be maintained such that no voids or vacancies or separation of layers occurs and/or damage to the RFID integrated circuit chip 22.

If precision lamination is required, an optional cutting stage 913 may be required to create registration holes. These registration holes will subsequently be utilized during the lamination process to precisely align top and bottom layers 210,220. The registration holes may be cut using a die cut or laser process, for example.

Alternatively, with more sophisticated equipment, layer alignment may be conducted by printing fiducials in an early printing stage and using a vision alignment system during lamination.

In a next step 918 the outer dimensions of the wristband are defined by cutting the lamination using a die cut or laser process as before. In addition, the holes 24, and holes for snap insert 418 and snap retainer 422 are formed.

A next step 920 is to install the snap insert 418. The snap insert 418 (e.g., the male portion of the fastener 320) is then placed through a hole formed in the end of the band 300. Note the orientation of the snap insert 318 from the drawings such as FIG. 3B—that is, the snap insert 318 should be inserted from the unprinted side of bottom layer 220, such that the catch portion is visibly protruding on the printed side.

In a next step 922, the snap retainer 422 (the female portion of the fastener 320) is inserted into wristband 300, from the same direction that the snap insert was placed.

The snap portions 418, 422 may be inserted in steps 920, 922 either manually or by machine process as long as the snaps are fully inserted and secure. Optionally, snap portions 418, 422 may be pre-joined such that only one of insertion steps 920, 922 need be executed to secure both snap portions 418, 422 to the assembly.

In an alternative embodiment, an adhesive fastening mechanism may be used. This can be carried out by applying a PSA to the outer-side of top layer 310 at distal end 316 of wristband 300.

Various changes can be made to the invention without departing from its true spirit and scope. For example, in one embodiment the top layer 210 is actually made somewhat thicker than the bottom layer 220. This places conductive circuitry into compression more readily when the wristband 300 is fastened around a wearer's wrist. That is, when such a band is installed around a wearer's wrist, with the thinner bottom layer 220 carrying the conductive components such as the RFID integrated circuit chip 22, antenna 30, and disabling wire 34, these will be placed into mechanical compression rather than into mechanical tension. This is because these components are closer to the inside of bend center than the outside of the bend center. Most conductors, particularly percolation conductors such as conductive inks, are mechanically stronger in compression than in tension. As such, this construct markedly increases the durability of wristband 300.

In addition, note a further advantage of the layout described herein in having the crossover portion 390 of the circuit laid out perpendicular to a lengthwise, longest axis of the wristband 300. This exposes the crossover 390 to less stress than it would be otherwise, alleviating a further possible failure point, and increasing robustness of the wristband 300.

It should be further noted that wristband 300 will be most susceptible to failure near the RFID integrated circuit chip 22 and cross-over 390 areas of wristband 300. In an improvement to wristband 300, bottom and/or top substrate 220, 210 are created such that they vary in thickness. This can be achieved by adding an additional layer of PET, for example, which is commonly referred to in the art as a "stiffener." The RFID chip 22 and crossover or bridge 390 are then placed such that they are near the part of wristband 300 containing the stiffener. The stiffener causes a non-uniform distribution of stress along wristband 300, such that more stress is concentrated away from the stiffener when wristband 300 is flexed. As such, RFID integrated circuit chip 22 and crossover 390 are placed under less stress during wristband flexion, substantially increasing circuit durability.

The antenna 30 can also be formed in other ways. For example, it can be formed by depositing copper and/or etching a copper layer. After electrodepositing a copper layer an additional over coating of tin or SnPb (solder) can be over coated to help improve the mechanical integrity of the circuit.

Other configurations are possible that use crossover or bridge 390 in different ways. For example, an alternative format in which the RFID integrated circuit chip 22 may be provided from the manufacturer is on a metal bridge or "strap." This strap is insulated on its underside such that it can be laid over the antenna in lieu of a dielectric and cross-over trace. In this manner, the crossover or bridge 390 can be achieved at the same time as the chip is placed down. This reduces the number of print passes and layers required to manufacture the device.

While this invention has been particularly shown and described with references to preferred embodiments thereof, it will be understood by those skilled in the art that various changes in form and details may be made therein without departing from the scope of the invention encompassed by the appended claims.

What is claimed as new and desired to be protected by Letters Patent of the United States is:

1. A method of manufacture of a wristband comprising the steps of:

providing a bottom substrate;
depositing first circuit elements on the bottom substrate;
curing the first circuit elements;
depositing a dielectric material on at least one predetermined area on the bottom substrate and of the cured first circuit elements;
depositing a remainder of the circuit on the bottom substrate and dielectric material;
securing an RFID integrated circuit chip to the bottom substrate to form a transponder with the first circuit elements and the remainder of the circuit; and
affixing a top substrate to the bottom substrate such that the dielectric material and transponder are disposed between the bottom substrate and top substrate.

2. The method of claim 1, further comprising the step of pre-treating the bottom substrate to prevent warping or shrinkage during manufacture.

3. The method of manufacture of claim 1, wherein the first circuit elements are deposited on the bottom substrate by printing a pattern with conductive ink.

4. The method of claim 3, wherein the first circuit elements include elements of an antenna and a disabling wire.

5. The method of manufacture of claim 1, further comprising the step of curing the dielectric material.

6. The method of manufacture of claim 1, wherein said dielectric material forms a bridge for portions of the transponder.

7. The method of manufacture of claim 1, wherein the chip is secured to the bottom substrate by use of one of conductive adhesive, anisotropic conductive adhesive, non-conductive paste, or solder.

8. The method of manufacture of claim 1, wherein the second substrate is fixed to the bottom substrate utilizing a pressure sensitive adhesive.

9. The method of manufacture of claim 1, further comprising the step of installing a snap insert to the bottom and second substrate, and installing a snap retainer in the bottom and second substrate.

10. The method of manufacture of claim 1, further comprising the step of providing stiffeners at preselected portions at either one of said bottom or top substrates.

11. The method of manufacture of claim 10 wherein the stiffener is provided at a position overlying at least one of the transponder chip or dielectric material.

12. The method of manufacture of claim 1 wherein affixing a top substrate to the bottom substrate such that the dielectric material and transponder are disposed between the bottom substrate and top substrate comprises affixing a top substrate that is substantially thicker than the bottom substrate.

* * * * *